Oct. 9, 1951     N. B. BACH     2,570,304
REMOVING SUSPENDED SOLIDS FROM LIQUIDS
Filed May 17, 1946     2 Sheets-Sheet 1
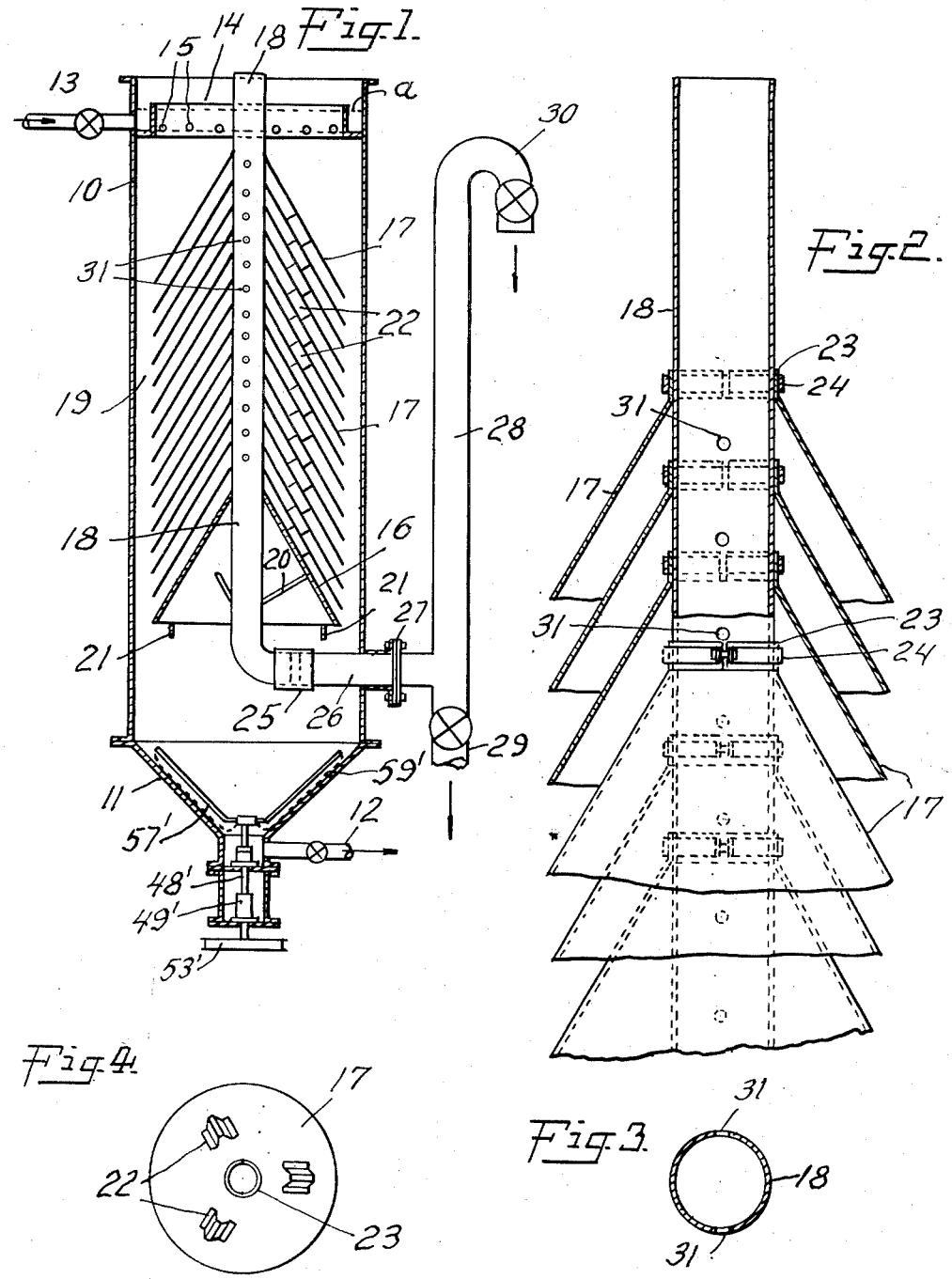
INVENTOR
Niels B. Bach
BY Pennie, Edmonds, Morton, Barrows
ATTORNEYS Oct. 9, 1951 — N. B. BACH — 2,570,304
REMOVING SUSPENDED SOLIDS FROM LIQUIDS
Filed May 17, 1946 — 2 Sheets-Sheet 2
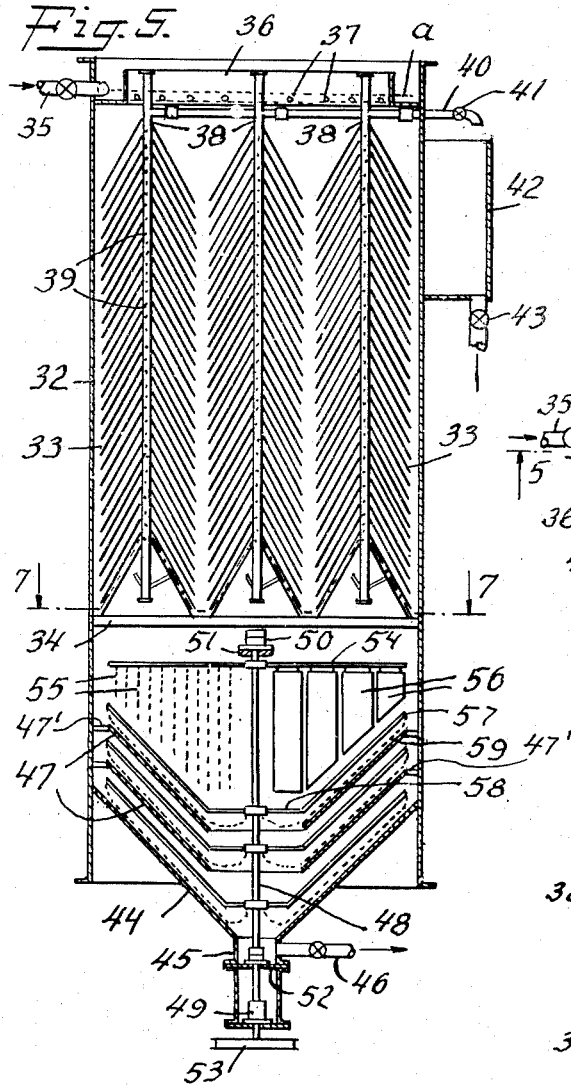
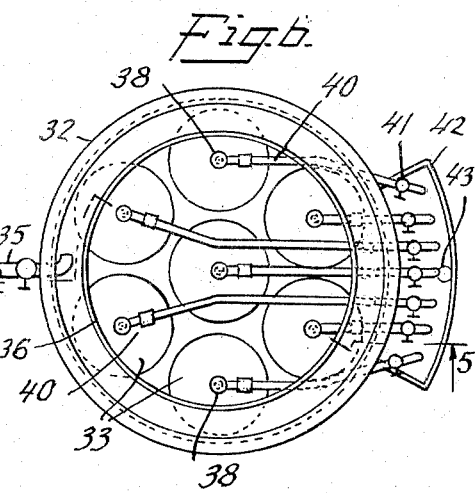
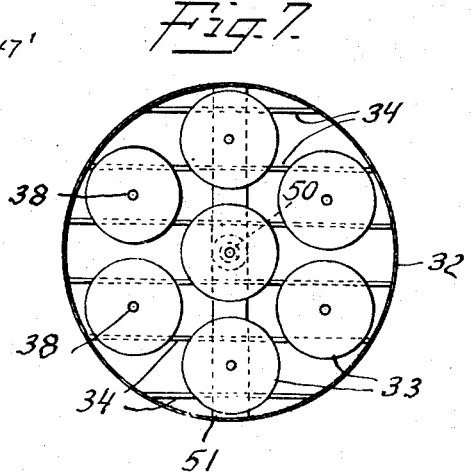
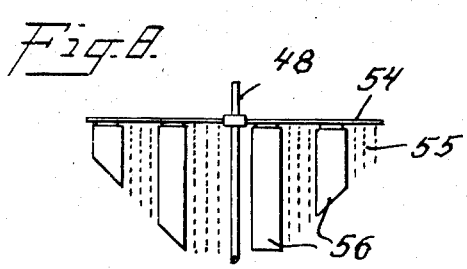
INVENTOR
Niels B. Bach
BY Pennie, Edmonds, Morton & Barrows
ATTORNEYS Patented Oct. 9, 1951

2,570,304

UNITED STATES PATENT OFFICE 2,570,304

REMOVING SUSPENDED SOLIDS FROM LIQUIDS

Niels B. Bach, New York, N. Y., assignor to The Mirrlees Watson Company Limited, Glasgow, Scotland, a British company Application May 17, 1946, Serial No. 670,415

7 Claims. (Cl. 210—55)

This invention relates to the clarification of liquids containing suspended solid matter, and has for its object the provision of certain improvements in method of and apparatus for clarification by sedimentation or settling.

The principal purpose of most industrial sedimentation or settling operations is to suitably clarify the liquid in the shortest possible time and to obtain the settled solid matter in as concentrated a form as possible. The time required to effect this purpose varies widely since the rate of settling is dependent (among other factors) upon the nature of the liquid medium, the nature and concentration of the suspended solid matter, the size and physical condition (i. e. dispersed or flocculated) of the solid particles, the size and character of the sedimentation tank etc.

The present invention is of special application in the sugar industry, particularly for clarifying liquids from suspended solids, such, for example, as are encountered in the defecation of cane and beet sugar juices, by the so-called continuous process. Continuous clarification of sugar juices is now commonly carried out in multi-tray clarifiers. Generally speaking, these clarifiers are divided by a plurality (usually not more than seven) of superposed horizontal or slightly inclined trays into a corresponding number of separate superposed settling zones. Solid matter settles on each of the trays and the provision of the plurality of trays reduces the path of descent of the solid matter to a fraction of the total depth of liquid undergoing sedimentation in the clarifier. The solid matter settling on the trays is gradually removed therefrom by slowly rotating scraping devices, while the clarified liquid is withdrawn from the upper part of each settling zone by centrally positioned draw-off pipes.

While it is desirable, from the point of view of clarifying capacity of the tank, to increase the number of settling zones so far as practical and therefore to space the trays fairly closely, it has been found in actual practice that, in order to have sufficient room for repairs and for periodical cleaning of the trays, as well as sufficient clearance between the rotary scraping devices and the stationary clarified liquor draw-off pipes, a certain minimum distance between the trays is required, in smaller tanks usually not less than 18 inches, and in larger tanks usually not less than 24 inches. Therefore, clarifiers of this type are usually of considerable height, and with respect to their clarifying capacity it has been found that, when clarifying sugar cane juice, the tank volume should be large enough to permit an average settling time of from 1½ to 2 hours, depending upon the quality of the sugar juice. Thus, the generally supposed advantages of continuous clarification are to some extent offset by the disadvantage of long settling time, resulting in comparatively high losses of sucrose through inversion.

In my copending patent application Serial No. 537,990, filed May 30, 1944, now abandoned, I have described certain improvements in sedimentation which considerably reduce the time required for obtaining the desired degree of clarification of liquids containing suspended matter. In a broad aspect, these improvements involve permitting solid matter to settle upon a large number of closely spaced and sharply inclined settling surfaces submerged in the body of liquid undergoing sedimentation, and causing solid matter settling thereon to flow downwardly over the surfaces thereby promoting flocculation and effecting the much desired dilution of suspended solid matter in the liquid, with consequent easier sedimentation. While these improvements are especially applicable to sedimentation by the so-called intermittent or batch process, I have discovered, in the course of further investigations, that the principle of these improvements, with certain modifications, can be advantageously applied to the clarification of liquids by a continuous process.

Based on the aforementioned discoveries, the method of the present invention is characterized in that settling of solid matter takes place simultaneously in a large number of shallow, steeply inclined and closely superposed settling zones, the inclination of the shallow settling zones being so steep that gravity alone causes settling solid matter to move toward the lower end of each settling zone into a common vertical settling channel communicating with each of the superposed shallow settling zones. Clarified liquid is withdrawn from near the top of each of the superposed shallow settling zones, and solid matter settling through the common vertical settling channel accumulates in a sludge bottom below the superposed shallow settling zones, from whence sludge may be withdrawn in a substantially continuous manner. While the method of the invention on the whole is a continuous process, I have found that distinct improvement in clarification results from periodically interrupting for short intervals the withdrawal of clarified liquid from the shallow settling zones. The shallow settling zones have preferably a generally conical contour in which the internal angle subtended by the conical contour is from 50 to 75 degrees. A relatively large number of superposed shallow settling zones are provided, for example from 15 to 30. In its preferred aspect, the invention contemplates the provision within a single clarifier or tank of several independent units or groups of superposed shallow settling zones. In accordance with a further feature of the invention, the sludge bottom has a considerable depth, and liquid occluded in the solid matter of the sludge in the upper part of the sludge bottom is liberated by mechanically working the sludge with slowly rotating stirrers, while solid matter is settled on a plurality of superposed inclined trays in the lower part of the sludge bottom, and settled solid matter is mechanically worked off the inclined trays into a discharge sump below the trays.

The improved clarifier of the invention comprises a tank having means for supplying the liquid to be clairified near its top and a sludge collecting bottom, preferably of substantial depth, with means for withdrawing sludge therefrom, and one or more settling units each comprising a multiplicity of sharply inclined and closely spaced superposed members forming a corresponding multiplicity of superposed shallow and steeply inclined settling zones with their lower ends in free communication with the liquid undergoing clarification and with the sludge collecting bottom. The inclination of the members is such that gravity alone causes settling solids to move towards the lower end of each settling zone, an inclination with respect to the vertical of from 25 to 37.5 degrees being suitable for the purpose. Thus, in operation, liquid to be clarified enters each superposed settling zone at its lower end and encounters solids settling in the zone as they descend towards the sludge bottom. Means are provided for discharging or withdrawing clarified liquid from the top of each superposed settling zone.

The sharply inclined members may advantageously be of a generally conical or pyramidal contour and mounted in closely superposed relation on a central pipe. Such conical members are downwardly and outwardly inclined with respect to the central pipe on which they are mounted, and their peripheries terminate short of the tank wall to provide a vertical settling channel surrounding the superposed members and in free communication with the sludge bottom of the tank. The central pipe has openings intermediate the apexes of each pair of adjacent conical members permitting the flow of clarified liquid from the tank into the pipe, and means are provided for withdrawing the clarified liquid from the central pipe or pipes. The sludge bottom is preferably provided with rotatable stirrers in its upper part and with a plurality of inclined settling trays in its lower part for working and concentrating the sludge.

In its preferred form, the clarifier is provided with a plurality of separate and removable settling units, each consisting of a large number of sharply inclined conical members closely assembled on a central pipe which serves at the same time as the support for the members and as a common discharge of clarified liquid from the shallow superposed settling zones formed by the members of the same unit. Thus, each settling unit is made up of a large number (e. g. 15 to 30) of superposed conical members providing shallow and bottomless settling zones in which sedimentation takes place at a rapid rate. Each unit of superposed conical members forms an independent operating unit within the main body of liquid undergoing sedimentation, each unit being independently supplied with liquid to be clarified (from the main body of liquid in the clarifier), and each unit discharging clarified liquid independently of the other units within the clarifier.

The foregoing and other novel features of the invention will be best understood from the following description taken in conjunction with the accompanying drawings, in which Fig. 1 is a sectional elevation of a single-unit sedimentation apparatus or clarifier embodying the invention, Fig. 2 is an enlarged sectional elevation of a settling unit showing the attachment of the conical members to the central pipe, Fig. 3 is a transverse section of the central pipe of Fig. 2, Fig. 4 is a top plan of one of the conical members, Fig. 5 is a sectional elevation of a multi-unit clarifier of the invention, on the section line 5—5 of Fig. 6, Fig. 6 is a top plan of the clarifier of Fig. 5, Fig. 7 is a transverse section on the section line 7—7 of Fig. 5, and Fig. 8 shows a modified arrangement of the sludge-stirring chains and paddles.

The apparatus illustrated in Figs. 1 to 4 is a single-unit clarifier and serves to illustrate certain fundamental features of the invention. However, in practice, particularly in the sugar industry, clarifiers of greater capacity with a plurality of settling units are generally preferable, such as illustrated in Figs. 5 to 7. Each settling unit is an independent operating unit being independently supplied with liquid to be clarified from the main body of liquid in the clarifier, and having independent means for the discharge of clarified liquid. Each unit, preferably even in the single unit clarifier, is removable from the clarifier for cleaning etc.

The clarifier of Fig. 1 comprises an elongated cylindrical tank 10 terminating in a conical solids (sludge or mud) collecting bottom 11 provided with a valved discharge pipe 12. Liquid to be clarified is introduced near the top of the tank through a valve-controlled inlet pipe 13 discharging into a circular launder 14 having liquid discharge openings 15 circumferentially spaced around its inner wall.

The settling unit is made up of a large number of sharply inclined conical members 16 and 17 closely assembled in superposed relation upon and secured to a central pipe 18. The conical members are downwardly and outwardly inclined with respect to the pipe 18 and their lower outer peripheries terminate short of the wall of the tank to provide an annular vertical channel 19 surrounding the superposed members. The superposed members form a corresponding number of superposed shallow and steeply inclined settling zones to the lower ends of which liquid to be clarified is supplied from the body of liquid in the tank. The lowermost conical member 16 is preferably more sturdy and stronger than the superposed conical members 17 since it serves as the principal support for the latter. To this end it is preferably constructed of sheet metal of a heavier gauge (e. g. 12 gauge) than used in making the other superposed members, for which about 22 gauge is generally satisfactory. It is furthermore additionally supported by stays 20 secured between its underside and the pipe 18. The assembly of superposed conical members and central pipe rests upon and is supported by a pair of spaced base bars 21 secured to the wall of the tank some distance above the conical bottom.

The conical members are sharply inclined, the angle subtended by the conical contour (i. e. the internal angle of the conical section) being 50 to 75 degrees, and preferably about 60 degrees. Thus, the inclination of the members with respect to the vertical is 25 to 37.5 degrees, and preferably about 30 degrees. The members are also closely spaced, being generally from 1 to 6 inches, preferably about 3 inches, apart (vertically). The diameter of the members (at their conical base) is not critical and may vary widely, although in general practice a diameter of 2 to 4 feet gives satisfactory results. In all cases, the diameter of the members is less than the diameter of the tank, so that an annular vertical channel (19) surrounds the settling unit of sufficient width for the adequate supply of liquid to be clarified to the lower end of each settling zone and to permit solid matter to fall freely therethrough.

The conical members 16 and 17 are appropriately spaced and supported in their superposed relation by spacing supports 22 secured to the upper surface of each member, three such supports circumferentially spaced about midway between the apex and base of the member being generally adequate. The supports 22 are sheet metal elements appropriately secured by base flanges to the upper side of each conical member 16 and 17 (Fig. 4). They have a vertical height corresponding to the space between adjacent conical members. Each conical member has a split collar 23 at its apex, which surrounds the central pipe 18 and permits the member to be readily slid over the pipe in assembling the unit. The split collars are secured to the pipe 18 by hose-clamps 24, or the like.

The central pipe 18 is open at the top, and is angularly bent at its bottom and screw-threaded into a union 25. A horizontal pipe 26, adapted to be screw-threaded into the union 25, extends through a flanged opening in the wall of the tank and is removably coupled at 27 to a vertical standpipe 28. The standpipe 28 has a valved bottom drain-off pipe 29, and terminates at its top in a valved goose-neck discharge 30, slightly below the normal liquid level (a) in the tank. The central pipe 18 has, intermediate the apexes of each pair of adjacent conical members, one or more openings 31 through which clarified liquid near the top of each shallow settling zone flows into the central pipe.

The multi-unit clarifier illustrated in Figs. 5, 6 and 7 comprises a cylindrical tank 32 in which seven settling units 33 are removably supported on base bars 34 secured to the inside of the tank wall. Liquid to be clarified is introduced near the top of the tank through a valve-controlled inlet pipe 35 discharging into a circular launder 36 having liquid discharge openings 37 circumferentially spaced around its inner wall.

The closely spaced and steeply inclined conical members of each settling unit are secured to a central pipe 38 having inlet openings 39 approximate the apex of each shallow settling zone, substantially as hereinbefore described in connection with the single-unit clarifier of Fig. 1. However, the pipes 38 are closed at their bottoms, and near their tops, but slightly below the normal liquid level a in the tank 32, are coupled to transverse discharge pipes 40, each of which has its independent control valve 41. The transverse pipes 40 discharge into a common well 42 having a valve-controlled outlet 43. The pipes 38 are preferably open at their tops to permit the escape of air, water vapor or other gas.

The cylindrical tank 32 extends a substantial distance below the lowermost conical member of the units 33, roughly a distance of from one-third to one-half of the height of the tank above the lowermost conical members and terminates in a conical bottom 44 having a depending discharge sump 45 with a valve-controlled sludge discharge pipe 46. Above the conical bottom 44 are a plurality (two shown in Fig. 5) of conical settling trays 47. The two trays 47 conform in contour with the conical bottom 44 and the three members are superposed and preferably uniformly spaced apart vertically. The upper outer periphery of each tray 47 is of smaller diameter than the tank, and each tray is secured at its periphery to the inside of the tank wall by circumferentially spaced brackets 47'. The central portion of each tray is open to permit the fall of solids into the discharge sump 45.

A rotary shaft 48 is centrally supported (within the lower part of the tank 32 and its conical bottom 44) in a step bearing 49 operatively mounted in a housing secured to the lower end of the sump 45. The upper end of the shaft 48 extends into a guide bearing 50 carried by a transverse bar 51 secured at its ends to opposite points of the tank wall. A sealing disc 52 prevents liquid in the sump 45 from seeping into the housing of the step bearing 49. The shaft 48 is provided with a pulley 53 at its lower end driven from any suitable source of power (not shown).

The shaft 48 has two or more horizontal radial arms 54, slightly below the bearing 50. Chains 55 depend from certain of these arms and paddles 56 depend from the others. The chains 55 and paddles 56 are horizontally spaced along their respective arms 54, and depend towards but terminate a uniform distance above the upper conical tray 47. Two or more upwardly inclined radial arms 57 are secured to the shaft 48 (by short horizontal connecting bars 58) to rotate in spaced relation above each tray 47 and the conical bottom 44. A chain 59 is connected between the outer ends of each arm 57 and the shaft 48 (or connecting bar 58), and scrapes the surface of the tray (or conical bottom) over which it is dragged by the rotation of the shaft 48. In the modification shown in Fig. 8, the depending paddles 56 alternate with the depending chains 56 in horizontally spaced relation on the radial arms 54.

In practicing the method of the invention in the clarifiers herein illustrated and described, liquid to be clarified is introduced in a substantially continuous manner near the top of the clarifier. Each adjacent pair of conical members forms a sharply inclined and very shallow bottomless settling zone to the lower end of which liquid to be clarified is supplied from the surrounding body of liquid in the tank and in which sedimentation takes place at a rapid rate. Due to the large number of such pairs of conical members there is a correspondingly large number of such shallow bottomless settling zones closely superposed. Due to the sharp inclination of the settling zones, the action of gravity alone causes the suspended solids to flow downwardly in each shallow settling zone towards the common vertical channel surrounding the superposed settling zones. As the solids thus flow downwardly they are brought into gentle contact with each other, thereby promoting flocculation, accelerating settling, and bringing about the much desired dilution (i. e. decrease in the ratio of solids to liquids) of suspended matter in the liquid with consequent easier sedimentation. Thus, solids settle towards the common vertical channel (or channels) and hence towards the sludge bottom, by gravity and in a substantially uniform manner, from the very large number of shallow settling zones distributed throughout the body of liquid undergoing clarification in the tank. Consequently, liquid entering the lower ends of the shallow settling zones and ascending therethrough is exposed to a veritable rain of flocculated solids constantly descending from the settling zones in a well distributed manner throuhgout the tank, the ascending liquid and descending solids in each settling zone moving countercurrently. Clarified liquid is continuously withdrawn from the apex of each shallow settling zone through the openings in the associated central pipe and thence through the pipe to a suitable point of discharge. Sludge is withdrawn in a substantially continuous manner from the sludge bottom, so that the overall clarification operation is carried out as a continuous process.

A further characteristic of the invention is the very considerable area of settling, due to the large number of closely superposed shallow settling zones. For example, the multi-unit clarifier of the invention illustrated in Figs. 5, 6 and 7 has seven separate setting units, and each unit provides thirty superposed shallow settling zones, or a total of 210 settling zones. Assuming the tank 32 to be 10 feet in diameter, and the conical members about 3 feet in diameter at their bases, a total of approximately 2500 square feet of settling area is provided within the clarifier. The conventional multi-tray clarifier of the prior art of comparable size (10 feet in diameter) with seven trays has a total settling area of only about 325 square feet. In numerous actual comparative tests of these two types of clarifiers, the clarifier of the invention has been found to deliver, in a given time unit, from 2 to 3 times as much clarified liquid as the multi-tray clarifier of the prior art, thus reducing the detention period of the liquid in the clarifier of the invention to ½ to 1 hour, as contrasted with the usual 1½ to 2 hours in the prior art multi-tray clarifier.

Due to the largely increased settling rate characteristic of the invention, it has been found that the volume of the sludge-collecting zone or sludge bottom of the clarifier should be relatively large as compared with the total tank volume. In the conventional multi-tray clarifier of the prior art, the sludge collecting zone or bottom has a volume of about 25% of the total tank volume. With the much larger clarifying capacity characteristic of the invention, a correspondingly increased amount of solid matter is separated from the liquid, and it is therefore necessary to discharge the sludge at an increased rate (with consequent thinner sludge), or to considerably increase the volume of the sludge collecting zone or bottom in order to prevent the sludge from filling up the lower part of the clarifier to such an extent that muddy liquid, instead of clarified liquid, is withdrawn from the lowermost shallow settling zones.

Thus, the greatly increased clarifying capacity of the upper part of the clarifier of the invention has presented the problem of concentrating and thickening the sludge in a manner sufficiently rapid to keep pace with that increased clarifying capacity in the upper part of the clarifier.

While the required sludge concentrating capacity can be obtained by increasing the depth of the sludge bottom of the tank, the necessary depth of sludge bottom can be reduced by aiding the liberation of liquid from solids in the sludge by stirrers, scrapers, plows and the like. Thus, in the multi-unit clarifier of Figs. 5, 6 and 7, concentration and thickening of the sludge are speeded up by the slowly rotating (e. g. 10 to 20 revolutions per hour) depending chains 55 and paddles 56. These slowly rotating stirring devices prevent the solid particles suspended in the sludge from resting on and supporting one another to such an extent that the body of sludge becomes stagnant with little or no sedimentation or thickening taking place. By the slow rotation of these stirring devices, the solid particles in or near their paths are moved about and brought into new positions in the course of which some further settling and thickening takes place because liquid is slowly being pressed out from between the solid particles. These stirring devices are very effective in reducing the sludge volume in their paths of movement and in thus preventing the sludge level reaching up to the lowermost shallow settling zones.

However, the extension of the stirrers into the lower part of the sludge bottom is not advisable since the ratio of solids to liquid in this area is already so high that further sedimentation cannot take place. Accordingly, where it is desired to discharge sludge of a heavy porridge-like consistency, the trays 47 swept by the slowly rotating scrapers 59 are provided in the lower part of the sludge bottom. The rotating scrapers 59, when sweeping over the trays 47 (as well as the conical bottom 44), carry in front of them a large amount of sludge which gradually becomes heavy as liquid is worked or pressed out between the solid particles due to the continuous pushing action of the scrapers over the tray surfaces. As the diameter of the trays 47 is somewhat smaller than the tank diameter, an annular vertical channel is formed between the peripheries of the trays and the surrounding tank wall which serves for the upward passage of liquid as well as gases which often are developed near the bottom of the sludge zone.

The combination of the slowly rotating stirring devices in the upper part of the sludge bottom with the plurality of vertically spaced trays and cooperating scraping devices in the lower part of the sludge bottom so promotes concentration and thickening of the sludge as to keep pace with the clarifying capacity of several settling units in the same tank. Where, as in Fig. 1, the clarifier has only a single settling unit, a relatively deep sludge zone (beneath the lowermost conical member) with slowly rotating scrapers 59' sweeping over the conical bottom 11 of the tank will often be found adequate. The scrapers 59' are operatively attached to radial arms 57' secured to the upper end of a vertical shaft 48' having a step bearing 49' and driving pulley 53' corresponding to the similarly indicated parts of Fig. 5.

While the invention is of special applicability in the clarification of sugar juices, where its advantages and efficiency have been demonstrated, it can equally well be applied to the clarification of any liquid containing suspended solids. While for most industrially encountered liquids the superposed conical members are vertically spaced from about 3 to 6 inches, a closer spacing is often desirable particularly with liquids of relatively high density. Thus, for example, with the conical members vertically spaced about 1 inch apart, it is possible by the practice of the invention to satisfactorily clarify concentrated sugar liquors, such as syrup and other high density sugar liquors. The number of superposed conical members will be determined, to some extent, by the vertical spacing between the members, as well as the general dimensions of the clarifier itself. At least 15 superposed conical members should generally be provided and more than 30 may be provided where advantageous. The superposed shallow and steeply inclined settling zones may have other than a conical or pyramidal contour, the essence of the invention in this respect being the provision of a large number of superposed shallow and steeply inclined settling zones in which the shallowness, steep inclination, and multiplicity of the zones induces settling of solid matter at a relatively rapid rate.

Improved clarification can be effected, particularly when clarifying liquids of high density or liquids containing very finely divided or slow-settling solids, by periodically interrupting for short intervals the withdrawal of clarified liquid from the shallow settling zones. When clarified liquid is continuously withdrawn through the pipe 28 (Fig. 1) or pipes 40 (Figs. 5 and 6), there is an ever-existing danger of very finely divided suspended matter (which settles or flocculates with difficulty) reaching the openings 31 (or 39) thereby contaminating the withdrawn clarified liquid. By temporarily closing the valve of the pipe 28 (or valves of the pipe 40), fresh liquid to be clarified will temporarily cease to enter (from the main body of liquid in the tank) the superposed shallow settling zones, with the result that sedimentation therein takes place at a rapid rate due to the absence of any ascending liquid current. By proper timing of the temporary closing and reopening of the clarified liquid outlet, substantially complete clarification can be effected in the shallow settling zones under relatively quiescent conditions (while the clarified liquid outlet is closed), and upon opening the clarified liquid outlet the fresh liquid to be clarified entering the settling zones will push the clarified liquid in these zones into the clarified liquid outlet, and thereupon the clarified liquid outlet is closed and the cycle of operations repeated.

During the intervals of interrupted clarified liquid discharge, fresh liquid is continuously introduced into the clarifier, and hence will accumulate at the top of the tank and raise the liquid level therein. However, this is not objectionable from a practical standpoint, if the volume of clarified liquid discharged while its control valve is open is properly proportioned to the volume of fresh liquid introduced during the cycle of temporary closing and reopening of the clarified liquid discharge. The effectiveness of this semi-continuous or periodically interrupted withdrawal of clarified liquid is due largely to the shallowness of the steeply inclined settling zones and the rapid settling which takes place therein. It is desirable to avoid an unduly large accumulation of fresh liquid above the settling zones, and hence to limit the interval during which the clarified liquid outlet is closed to a very few minutes, and it follows that the settling zones should be so shallow (only a few inches deep) that clarification is effected during the brief interval between the closing and reopening of the clarified liquid outlet. In practice, satisfactory results have been attained by closing the clarified liquid outlet for 2 to 4 minutes during each 10 to 15 minute period of operation, although these figures can be widely varied depending upon the particular operating conditions.

I claim:

1. A clarifier comprising a tank for liquid to be clarified, a plurality of vertically-disposed settling units arranged side by side in an upper part of the tank, each settling unit comprising a vertically-extending central pipe and a multiplicity of downwardly-inclined conical members mounted at their apexes upon the central pipe in superimposed relation and having an internal angle subtended by the conical contour of the conical members of between about 50° and 75°, the outer peripheries of the members of each unit terminating short of the tank wall to provide a vertical settling space about the superposed conical members, the central pipe of each unit having openings intermediate the apexes of each pair of adjacent conical members for the discharge of clarified liquid into the respective central pipes, means for withdrawing clarified liquid from said pipes, a sludge-collecting tray underlying all of the units and in free communication with said settling space, a rotatable stirrer between said units and the sludge-collecting tray, a rotatable scraper operating over the upper surface of the sludge-collecting tray and below the stirrer, and means for withdrawing sludge collecting on the sludge-collecting tray.

2. A clarifier as defined in claim 1 in which a plurality of superposed sludge-collecting trays and cooperating scrapers are provided between the bottom of the tank and the rotating stirrer.

3. A clarifier as defined in claim 1 in which the spacing between adjacent conical members of the units does not substantially exceed six inches.

4. In a process of clarifying a liquid containing suspended solid matter in which settling of the solid matter in the liquid being clarified takes place simultaneously in a large number of shallow, closely superposed settling zones inclined to the vertical sufficiently steeply that gravity alone causes the settling solid matter to move toward the lower end of each settling zone into a common vertical settling zone communicating with each of the superposed shallow settling zones, clarified liquid is withdrawn from near the top of each of the superposed settling zones simultaneously with the introduction of liquid to be clarified into said zones and the solid matter settling to the bottom of the vertical settling zone is collected in a sludge zone and discharged; the improvement which comprises periodically interrupting the withdrawal of the clarified liquid from the settling zones for periods of time relatively short compared to the time during which said simultaneous withdrawal of the clarified liquid takes place.

5. In a process for clarifying a liquid containing suspended solid matter as defined in claim 4, the further improvement in which the length of the periods of said simultaneous withdrawal of the clarified liquid are from about 10 to 15 minutes and the length of the periods of periodic interruption are from about 2 to 4 minutes.

6. In a process for clarifying a liquid containing suspended solid matter as defined in claim 4, the further improvement in which the liquid to be clarified is permitted to enter the clarification apparatus continuously during the periods during which the withdrawal of the clarified liquid is interrupted.

7. In a process for clarifying a liquid containing suspended solid matter as defined in claim 4 in which the superposed settling zones do not substantially exceed six inches in a direction normal to their inclined direction.

NIELS B. BACH.

REFERENCES CITED

The following references are of record in the file of this patent:

UNITED STATES PATENTS

| Number | Name | Date |
|---|---|---|
| 623,828 | Riensch | Apr. 25, 1899 |
| 1,030,271 | Arbuckle | June 25, 1917 |
| 1,718,871 | Nordell | June 25, 1929 |
| 1,723,197 | Montgomery | Aug. 6, 1929 |
| 2,010,435 | Matheson | Aug. 6, 1935 |
| 2,141,371 | Bach | Dec. 27, 1938 |
| 2,243,582 | Soffe | May 27, 1941 |
| 2,253,500 | Arango | Aug. 26, 1941 |
| 2,279,970 | Coe | Apr. 14, 1942 |

FOREIGN PATENTS

| Number | Country | Date |
|---|---|---|
| 386,312 | Great Britain | Jan. 4, 1933 |
| 72,007 | Germany | Nov. 11, 1893 |